(12) United States Patent
Spurlock et al.

(10) Patent No.: US 10,579,544 B2
(45) Date of Patent: Mar. 3, 2020

(54) VIRTUALIZED TRUSTED STORAGE (71) Applicant: McAfee, LLC, Santa Clara, CA (US)

(72) Inventors: Joel R. Spurlock, Portland, OR (US); Zheng Zhang, Portland, OR (US); Aditya Kapoor, Portland, OR (US); Jonathan L. Edwards, Portland, OR (US); Khai N. Pham, Beaverton, OR (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 16/218,454

(22) Filed: Dec. 12, 2018

(65) Prior Publication Data

US 2019/0155752 A1    May 23, 2019

Related U.S. Application Data (63) Continuation of application No. 14/752,914, filed on Jun. 27, 2015, now Pat. No. 10,162,767.

(51) Int. Cl.
| | |
|---|---|
| *G06F 12/14* | (2006.01) |
| *G06F 21/57* | (2013.01) |
| *G06F 21/62* | (2013.01) |
| *H04L 29/08* | (2006.01) |
| *G06F 21/55* | (2013.01) |
| *G06F 21/78* | (2013.01) |

(Continued)

(52) U.S. Cl.
CPC ............ *G06F 12/145* (2013.01); *G06F 16/00* (2019.01); *G06F 16/25* (2019.01); *G06F 21/55* (2013.01); *G06F 21/57* (2013.01); *G06F 21/62* (2013.01); *G06F 21/6218* (2013.01); *G06F 21/78* (2013.01); *H04L 63/10* (2013.01); *H04L 67/1097* (2013.01); *G06F 2212/1052* (2013.01); *G06F 2221/2141* (2013.01); *G06F 2221/2149* (2013.01)

(58) Field of Classification Search
CPC ........ G06F 12/145; G06F 21/62; G06F 21/55; G06F 21/57; G06F 21/78; G06F 21/6218; G06F 16/00; G06F 16/25; G06F 2221/2149; G06F 2221/2141; H04L 63/10; H04L 67/1097; H04L 2212/1052
See application file for complete search history.

(56) References Cited

U.S. PATENT DOCUMENTS

| | | |
|---|---|---|
| 5,987,610 A | 11/1999 | Franczek et al. |
| 6,073,142 A | 6/2000 | Geiger et al. |

(Continued)

OTHER PUBLICATIONS

International Search Report and Written Opinion in International Application No. PCT/US2016/033854, dated Sep. 6, 2016, 11 pages.

*Primary Examiner* — Hiep T Nguyen
(74) *Attorney, Agent, or Firm* — Patent Capital Group (57) ABSTRACT

Particular embodiments described herein provide for an electronic device that can be configured to receive a request from a process to access data is a system, determine if the data is in a virtualized protected area of memory in the system, and allow access to the data if the data is in the virtualized protected area of memory and the process is a trusted process. The electronic device can also be configured to determine if new data should be protected, store the new data in the virtualized protected area of memory in the system if the new data should be protected, and store the new data in an unprotected area of memory in the system if the new data should not be protected.

20 Claims, 8 Drawing Sheets

(51) Int. Cl.
*H04L 29/06* (2006.01)
*G06F 16/00* (2019.01)
*G06F 16/25* (2019.01)

(56) References Cited

U.S. PATENT DOCUMENTS

| | | |
|---|---|---|
| 6,460,050 B1 | 10/2002 | Pace et al. |
| 7,506,155 B1 | 3/2009 | Stewart et al. |
| 7,512,810 B1 | 3/2009 | Ryan |
| 7,577,985 B1 * | 8/2009 | Urosu ................ G06F 21/6218 726/1 |
| 8,156,298 B1 | 4/2012 | Stubblefield |
| 8,181,033 B1 * | 5/2012 | Paul ........................ G06F 21/00 713/187 |
| 8,572,410 B1 | 10/2013 | Tkacik et al. |
| 8,813,174 B1 | 8/2014 | Koeten et al. |
| 10,162,767 B2 * | 12/2018 | Spurlock ................ G06F 16/00 |
| 2002/0133702 A1 | 9/2002 | Stevens |
| 2007/0005919 A1 | 1/2007 | Riel |
| 2008/0256322 A1 | 10/2008 | Chang et al. |
| 2010/0115201 A1 | 5/2010 | Hsu |
| 2010/0169667 A1 | 7/2010 | Dewan |
| 2011/0231568 A1 | 9/2011 | Bansal et al. |
| 2012/0254982 A1 | 10/2012 | Sallam |
| 2012/0254995 A1 | 10/2012 | Sallam |
| 2013/0019142 A1 | 1/2013 | Teo et al. |
| 2013/0086299 A1 | 4/2013 | Epstein |
| 2013/0097354 A1 | 4/2013 | Arges et al. |
| 2013/0117563 A1 | 5/2013 | Grabelkovsky |
| 2013/0269006 A1 * | 10/2013 | Baron .................... H04L 63/08 726/4 |
| 2013/0305046 A1 | 11/2013 | Mankovski et al. |
| 2014/0082372 A1 | 3/2014 | Nemazie et al. |
| 2014/0115660 A1 | 4/2014 | Chinta |
| 2014/0250500 A1 | 9/2014 | Lee |
| 2014/0282821 A1 | 9/2014 | Adler et al. |
| 2015/0101024 A1 | 4/2015 | Leggette et al. |
| 2015/0106946 A1 | 4/2015 | Soman et al. |
| 2015/0301761 A1 | 10/2015 | Sijstermans et al. |
| 2016/0269436 A1 | 9/2016 | Danielson et al. |
| 2016/0364578 A1 | 12/2016 | Karn |
| 2017/0091590 A1 | 3/2017 | Sawhney et al. |
| 2017/0311054 A1 | 10/2017 | Donaghey et al. |

* cited by examiner

VIRTUALIZED TRUSTED STORAGE

CROSS-REFERENCE TO RELATED APPLICATION

This Application is a continuation (and claims the benefit of priority under 35 U.S.C. § 120) of U.S. application Ser. No. 14/752,914, filed Jun. 27, 2015, entitled "VIRTUALIZED TRUSTED STORAGE," Inventors Joel R. Spurlock, et al., which is hereby incorporated by reference in its entirety.

TECHNICAL FIELD

This disclosure relates in general to the field of information security, and more particularly, to virtualized trusted storage.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software and devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1A:
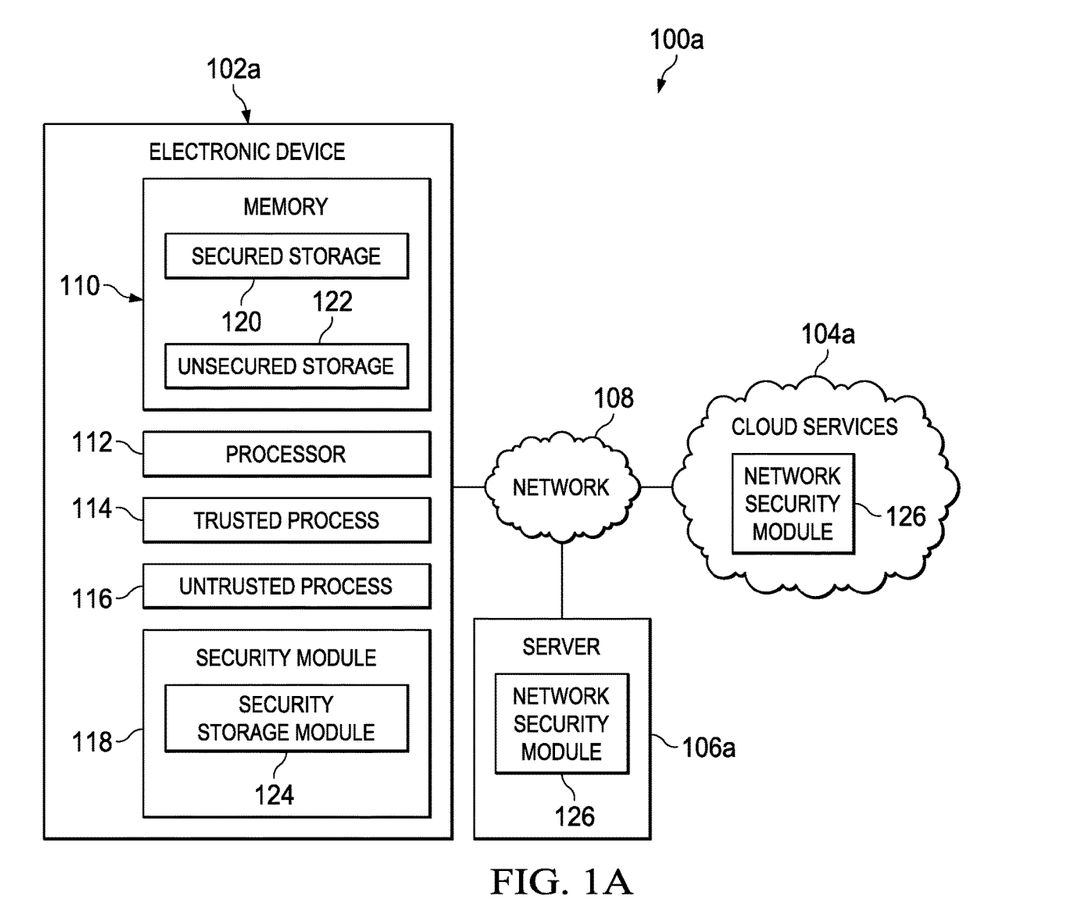
FIG. 1A is a simplified block diagram of a communication system for virtualized trusted storage, in accordance with an embodiment of the present disclosure.

FIG. 1A is a simplified block diagram of a communication system 100a for virtualized trusted storage, in accordance with an embodiment of the present disclosure. As illustrated in FIG. 1A, an embodiment of communication system 100a can include an electronic device 102a, cloud services 104a, and a server 106a. Electronic device 102a can include memory 110, a processor 112, a trusted process 114, an untrusted process 116, and a security module 118. Memory 110 can include secured storage 120 and unsecured storage 122. Security module 118 can include a security storage module 124. Cloud services 104a and server 106a can each include a network security module 126. Electronic device 102a, cloud services 104a, and server 106a may be in communication using network 108.

Figure 1B:
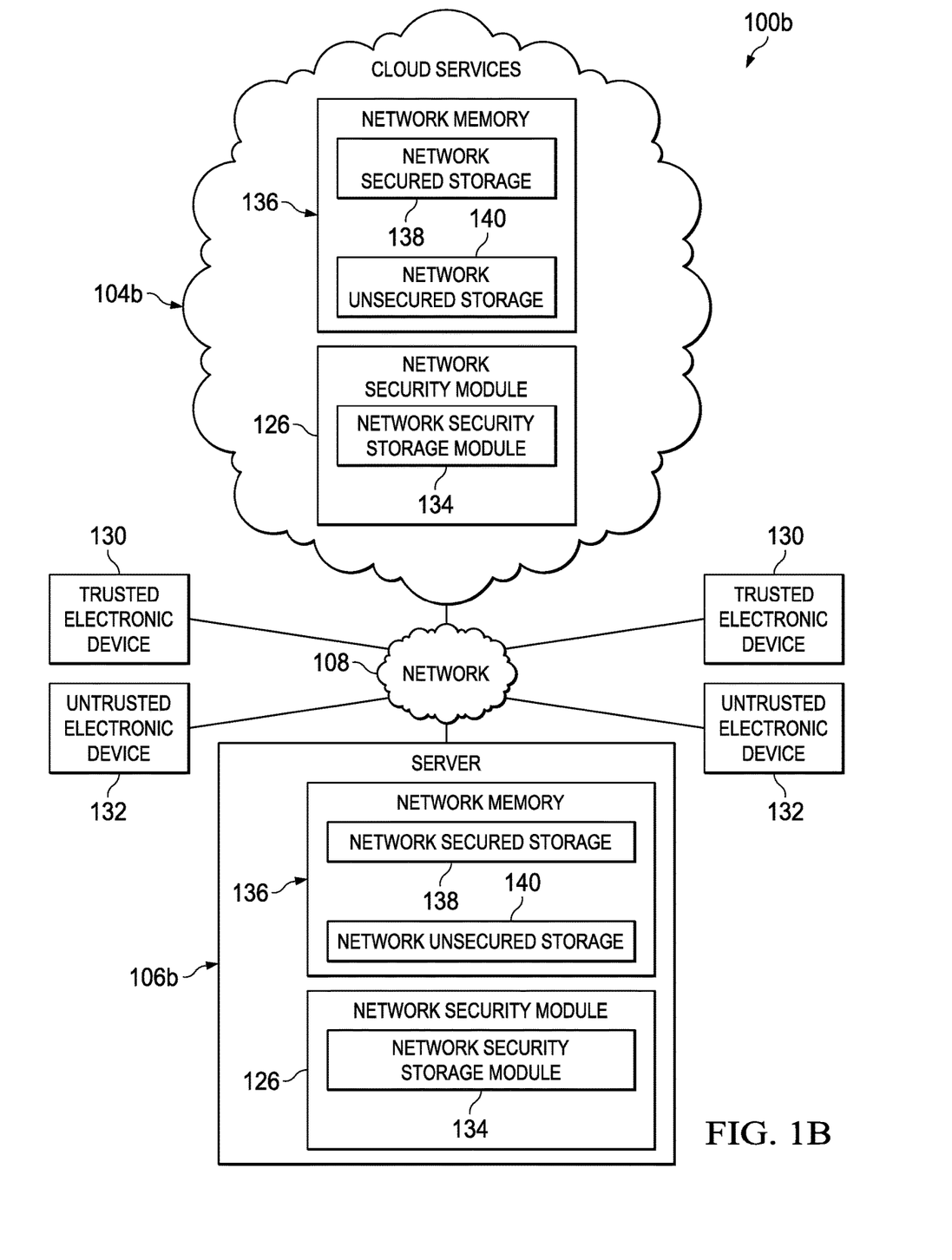
FIG. 1B is a simplified block diagram of a communication system for virtualized trusted storage, in accordance with an embodiment of the present disclosure.

Turning to FIG. 1B, FIG. 1B is a simplified block diagram of a communication system 100b for virtualized trusted storage, in accordance with an embodiment of the present disclosure. As illustrated in FIG. 1B, an embodiment of communication system 100b can include cloud services 104b, a server 106b, one or more trusted electronic devices 130, and one or more untrusted electronic devices 132. Cloud services 104b and server 106b can each include network security module 126 and network memory 136. Network security module 126 can include a network security storage module 134. Network memory 136 can include network secured storage 138 and network unsecured storage 140.

In an example embodiments, communication systems 100a and 100b can be configured for virtualized trusted secure storage, in accordance with an embodiment of the present disclosure. Security storage module 124 can be configured to use a file system driver and a reputation of process (e.g. trusted or untrusted) to dynamically virtualize a file system and secure critical user data. For example, communication systems 100a and 100b can be configured to receive a request from a process to access data is a system, determine if the data is in a virtualized protected area of memory in the system (e.g., secured storage 120 or network secured storage 138), allow access to the data is the data is not in the virtualized protected area of memory (e.g., unsecured storage 122 or network unsecured storage 140), and allow access to the data if the data is in the virtualized protected area of memory and the process is a trusted process. For example, security module 118 or network security module 126 can be configured to determine if a process is a trusted or untrusted process. Communication systems 100a and 100b can also be configured to determine if new data should be protected, store the new data in the virtualized protected area of memory in the system if the new data should be protected, and store the new data in an unprotected area of memory in the system if the new data should not be protected.

Elements of FIGS. 1A and 1B may be coupled to one another through one or more interfaces employing any suitable connections (wired or wireless), which provide viable pathways for network (e.g., network 108, etc.) communications. Additionally, any one or more of these elements of FIGS. 1A and 1B may be combined or removed from the architecture based on particular configuration needs. Communication systems 100a and 100b may include a configuration capable of transmission control protocol/Internet protocol (TCP/IP) communications for the transmission or reception of packets in a network. Communication systems 100a and 100b may also operate in conjunction with a user datagram protocol/IP (UDP/IP) or any other suitable protocol where appropriate and based on particular needs.

For purposes of illustrating certain example techniques of communication systems 100a and 100b, it is important to understand the communications that may be traversing the network environment. The following foundational information may be viewed as a basis from which the present disclosure may be properly explained.

Currently, the various concepts around virtualized trusted storage require the application vendor to write specific code or include binaries that are linked to a single secure storage. In addition, some existing solutions are custom coded for a single application (e.g., green border or other browser security solutions). Some current solutions have not been successful in providing security against malicious code or hackers inspecting, modifying, or removing user information and documents. What is needed is a system and method that can help secure data against ransomware, password stealers, or other threats that harvest or modify data on an electronic device. It would be beneficial is the system and method could use virtualized storage to secure trusted data.

A communication system for virtualized trusted storage, as outlined in FIGS. 1A and 1B, can resolve these issues (and others). Communication systems 100a and 100b may be configured to virtualize trusted process storage to a secure storage area (secure vault, encrypted file system, cloud storage, etc.). The secure storage area (e.g., secured storage 120 or network secured storage 138) may be virtualized by security storage module 124. Untrusted processes storage cannot access the virtualized trusted storage. In an example, file system drivers can redirect traffic to the virtualized trusted storage to make the virtualized trusted storage invisible to an untrusted application or an untrusted user.

Communication systems 100a and 100b may be configured to use security storage module 124 and/or a filter driver to redirect input/output (I/O) from trusted processes (e.g. trusted process 114) to secured storage (e.g., secured storage 120) and I/O from untrusted processes (e.g., untrusted process 116) to unsecured storage (e.g., unsecured storage 122). Untrusted processes do not get access to the secured storage and will get an untrusted view of the location. Trusted processes get full access to and a trusted view of the secured storage and unsecured storage.

The secured storage can be implemented in a variety of ways. For example, in an enterprise space, secured storage could be a cloud vault. In a consumer space, the secured storage could be a secured vault or locally encrypted virtual file system. A policy on minimum reputation can be set for access to the secured storage. In one example, the reputation of a process can be determined by security module 118 or network security module 126. The secured storage can also be protected by the file type trying to access the secured storage or on a per application type basis. The virtualization of the secured storage can be applied to execute on system locations (e.g. My Documents), on specific folders, or for specific applications. The system can mark individual files as important and only to be accessed by trusted applications and add the important file to secure storage. In addition, files can be removed from secure storage or added to the secured storage based on a user configuration. For example, a user may set a configuration where all applications should be able to access a specific file, only trusted applications should be able to access the specific file, only trusted applications of a specific type should be able to access the specific file, etc. Establishing the reputation of a process may be done using cloud services, local certifications, whitelists, etc.

Turning to the infrastructure of FIGS. 1A and 1B, communication systems 100a and 100b in accordance with an example embodiment is shown. Generally, communication systems 100a and 100b can be implemented in any type or topology of networks. Network 108 represents a series of points or nodes of interconnected communication paths for receiving and transmitting packets of information that propagate through communication systems 100a and 100b. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication systems 100a and 100b, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication systems 100a and 100b. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102a, cloud services 104a and 104b, server 106a and 106b, one or more trusted electronic devices 130, and one or more untrusted electronic devices 132 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication systems 100a and 100b, each of electronic device 102a, cloud services 104a and 104b, server 106a and 106b, one or more trusted electronic devices 130, and one or more untrusted electronic devices 132 can include memory elements for storing information to be used in the operations outlined herein. Each of electronic device 102a, cloud services 104a and 104b, server 106a and 106b, one or more trusted electronic devices 130, and one or more untrusted electronic devices 132 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication systems 100a and 100b could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication systems 100a and 100b, such as electronic device 102a, cloud services 104a 104b, and server 106a and 106b, may include software modules (e.g., security module 118, security storage module 124, network security module 126, and network security storage module 134) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 102a, cloud services 104a and 104b, server 106a and 106b, one or more trusted electronic devices 130, and one or more untrusted electronic devices 132 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102a can be a network element and include, for example, desktop computers, laptop computers, mobile devices, personal digital assistants, smartphones, tablets, or other similar devices. Cloud services 104a is configured to provide cloud services to electronic device 102a. Cloud services 104b is configured to provide cloud services to one or more trusted electronic devices 130 and one or more untrusted electronic devices 132. Cloud services may generally be defined as the use of computing resources that are delivered as a service over a network, such as the Internet. Typically, compute, storage, and network resources are offered in a cloud infrastructure, effectively shifting the workload from a local network to the cloud network. Server 106a and 106b can be a network element such as a server or virtual server and can be associated with clients, customers, endpoints, or end users wishing to initiate a communication in communication system 100a and 100b via some network (e.g., network 108). The term 'server' is inclusive of devices used to serve the requests of clients and/or perform some computational task on behalf of clients within communication systems 100a and 100b. Although security module 118 is represented in FIG. 1A as being located in electronic device 102a, this is for illustrative purposes only. Security module 118 could be combined or separated in any suitable configuration. Furthermore, security module 118 could be integrated with or distributed in another network accessible by electronic device 102a such as cloud services 104a or server 106a.

Figure 2:
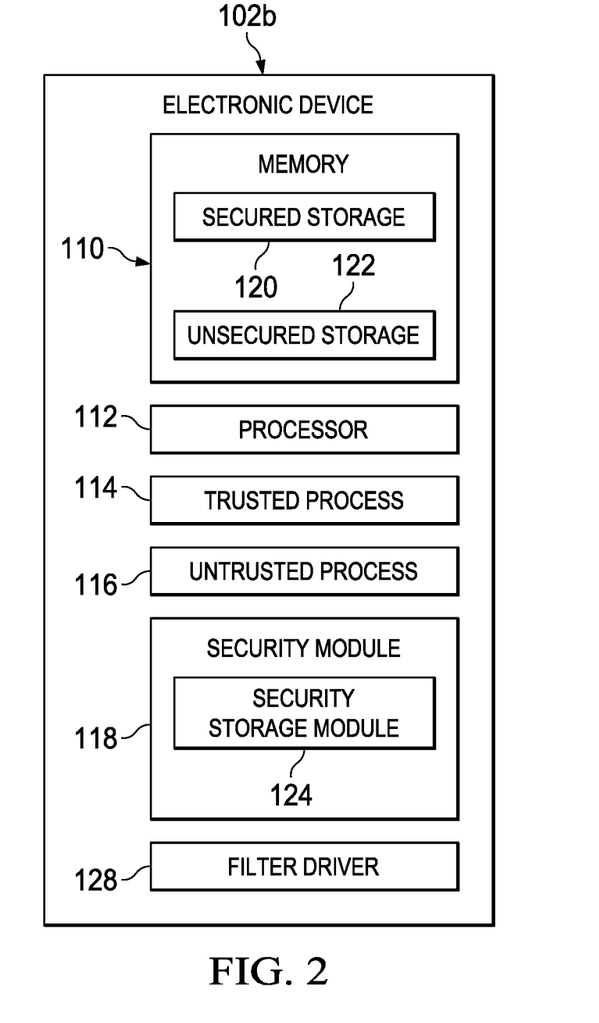
FIG. 2 is a simplified block diagram of a portion of a communication system for virtualized trusted storage, in accordance with an embodiment of the present disclosure.

Turning to FIG. 2, FIG. 2 is a simplified block diagram of a portion of a communication system 100a for virtualized trusted secure storage, in accordance with an embodiment of the present disclosure. FIG. 2 illustrates an embodiment of an electronic device 102b. Electronic device 102b can include memory 110, processor 112, trusted process 114, untrusted process 116, security module 118, and a filter driver 128.

Security storage module 124 can be configured to use filter driver 128 to redirect I/O from trusted process 114 to secured storage 120 and I/O from untrusted processes 116 to unsecured storage 122. Untrusted processes do not get access to the secured storage and will get an untrusted view of the location. Trusted processes get full access to and a trusted view of the secured storage and unsecured storage.

Figure 3A:
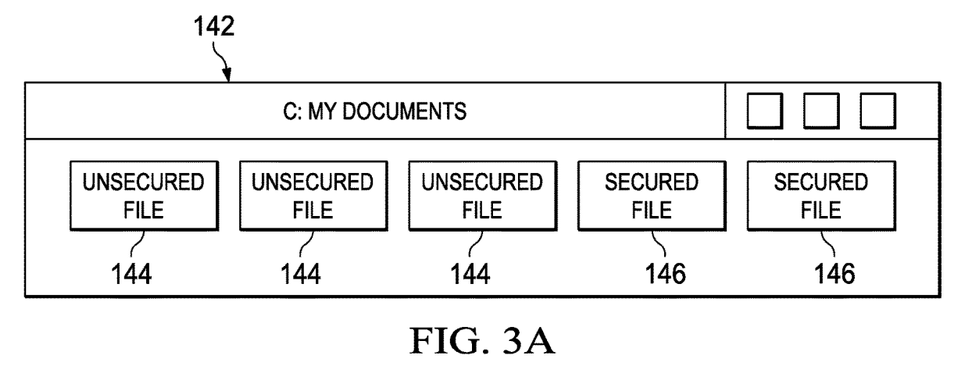
FIG. 3A is a simplified block diagram of a portion of a communication system for virtualized trusted storage, in accordance with an embodiment of the present disclosure.

Turning to FIG. 3A, FIG. 3A is a simplified block diagram of a portion of a communication system for virtualized trusted storage, in accordance with an embodiment of the present disclosure. As illustrated in FIG. 3A, the virtualization of the secured storage can be applied to execute on system locations such as My Documents. My Documents is the commonly recognized name of a special folder in Microsoft Windows® that is allocated to help users store their personal data files. When a trusted user, trusted process 114, or some other trusted application, accesses a My Documents folder, a secured view 142 or access of the My Documents folder can include both unsecured files 144 and secured files 146.

Figure 3B:
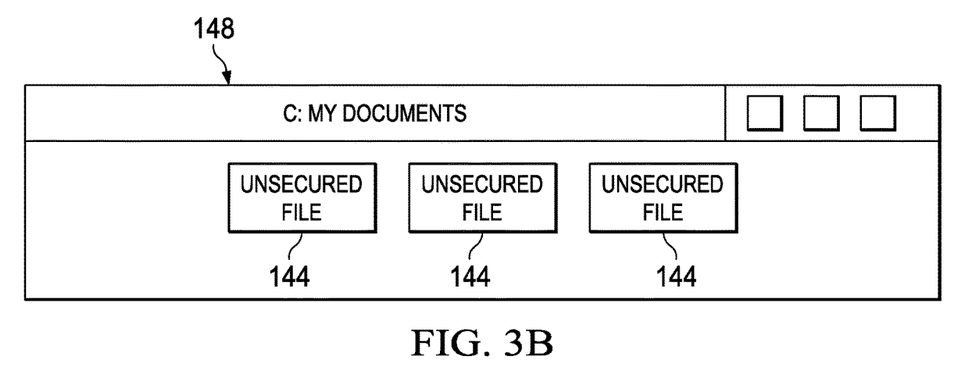
FIG. 3B is a simplified block diagram of a portion of a communication system for virtualized trusted storage, in accordance with an embodiment of the present disclosure.

Turning to FIG. 3B, FIG. 3B is a simplified block diagram of a portion of a communication system for virtualized trusted storage, in accordance with an embodiment of the present disclosure. As illustrated in FIG. 3B, when an untrusted user, untrusted process 116, or some other untrusted application, accesses the My Documents folder, an unsecured view 148 or access of the My Documents folder can include only unsecured files 144. Because the user, process, or other application is not trusted, secured files 146 are not available.

Figure 4:
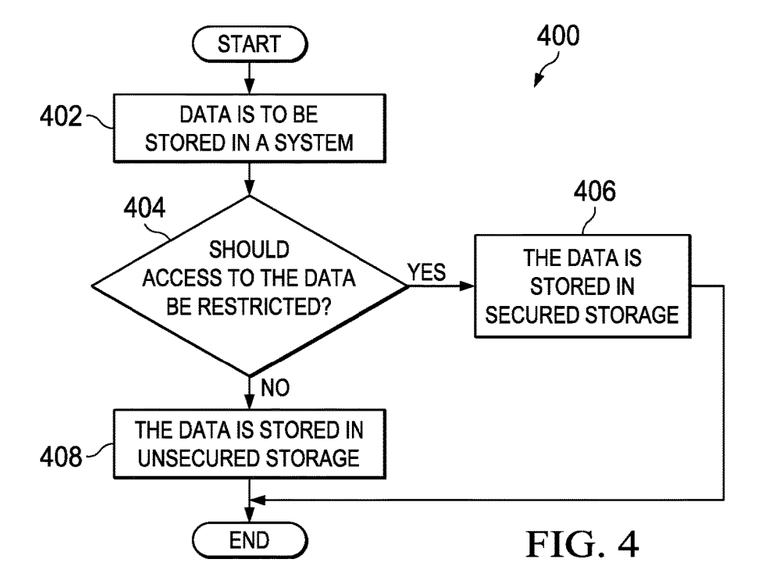
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with virtualized secure storage, in accordance with an embodiment. In an embodiment, one or more operations of flow 400 may be performed by security module 118, security storage module 124, network security module 126, and network security storage module 134. At 402, data is to be stored in a system. At 404, the system determines if access to the data is be restricted. For example, the data may be from a trusted application, a user may set a configuration where access to the data is restricted, etc. If the access to the data should be restricted, then the data is stored in secured storage, as in 406. If the data should not be restricted, then the data is stored in unsecured storage, as in 408.

Figure 5:
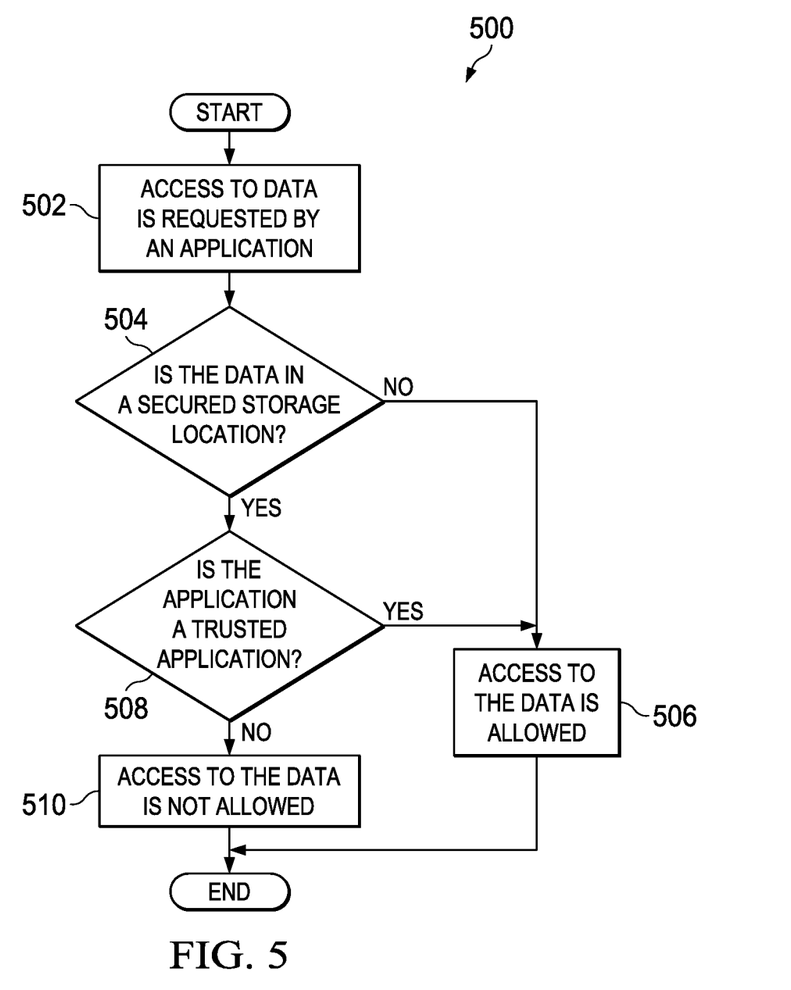
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with virtualized secure storage, in accordance with an embodiment. In an embodiment, one or more operations of flow 500 may be performed by security module 118, security storage module 124, network security module 126, and network security storage module 134. At 502, access to data is requested by an application. At 504, the system determines if the data is in a secured storage location. If the data is not in a secured storage location, then access to the data is allowed, as in 506. If the data is in a secured storage location, then the system determines if the application is a trusted application, as in 508. If the application is a trusted application, then access to the data is allowed, as in 506. If the application is not a trusted application, then access to the data is not allowed, as in 510.

Figure 6:
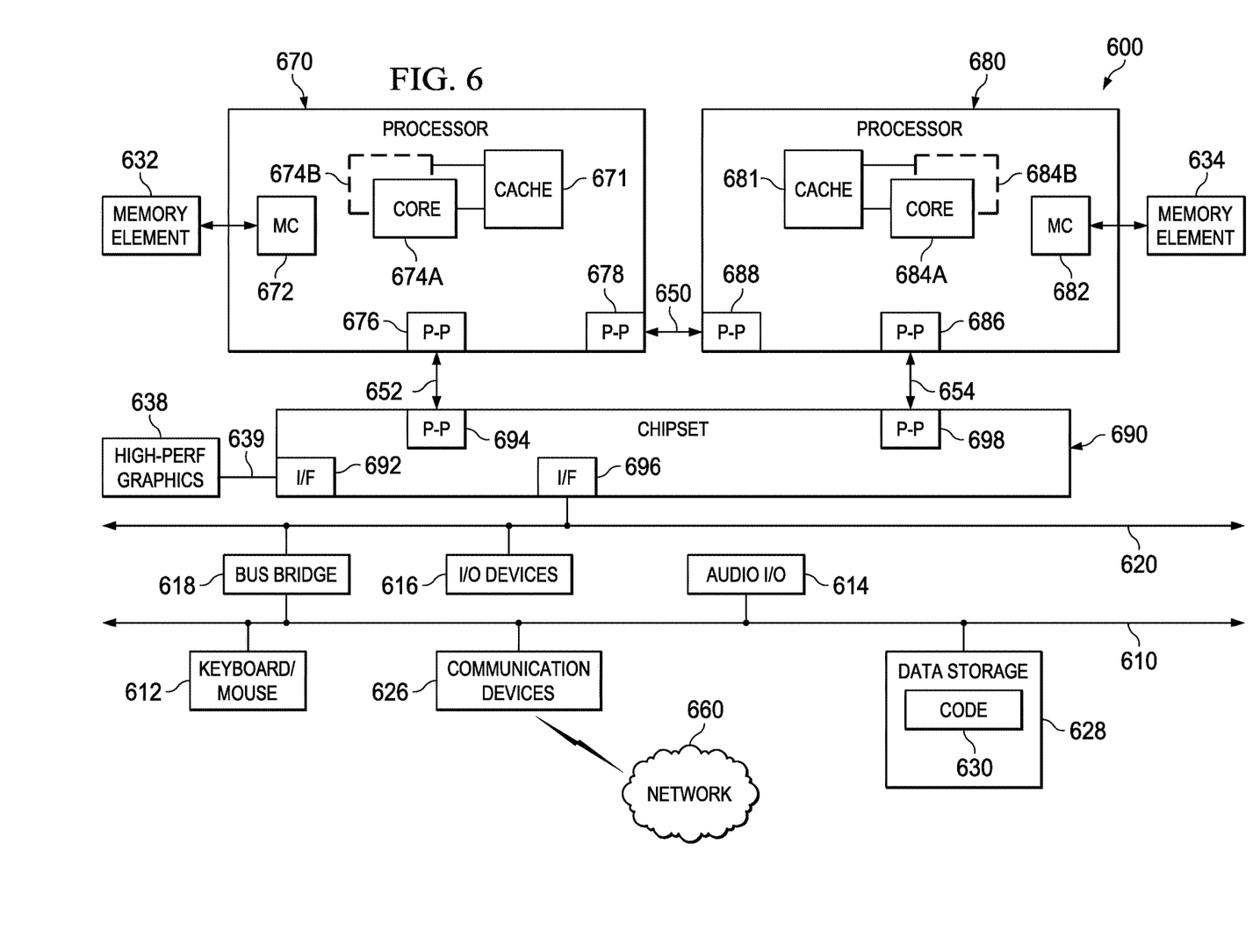
FIG. 6 is a block diagram illustrating an example computing system that is arranged in a point-to-point configuration in accordance with an embodiment.

FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, one or more of the network elements of communication systems 100a and 100b may be configured in the same or similar manner as computing system 600.

As illustrated in FIG. 6, system 600 may include several processors, of which only two, processors 670 and 680, are shown for clarity. While two processors 670 and 680 are shown, it is to be understood that an embodiment of system 600 may also include only one such processor. Processors 670 and 680 may each include a set of cores (i.e., processor cores 674A and 674B and processor cores 684A and 684B) to execute multiple threads of a program. The cores may be configured to execute instruction code in a manner similar to that discussed above with reference to FIGS. 1-5. Each processor 670, 680 may include at least one shared cache 671, 681. Shared caches 671, 681 may store data (e.g., instructions) that are utilized by one or more components of processors 670, 680, such as processor cores 674 and 684.

Processors 670 and 680 may also each include integrated memory controller logic (MC) 672 and 682 to communicate with memory elements 632 and 634. Memory elements 632 and/or 634 may store various data used by processors 670 and 680. In alternative embodiments, memory controller logic 672 and 682 may be discrete logic separate from processors 670 and 680.

Processors 670 and 680 may be any type of processor and may exchange data via a point-to-point (PtP) interface 650 using point-to-point interface circuits 678 and 688, respectively. Processors 670 and 680 may each exchange data with a chipset 690 via individual point-to-point interfaces 652 and 654 using point-to-point interface circuits 676, 686, 694, and 698. Chipset 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

Chipset 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a keyboard/mouse 612 (or other input devices such as a touch screen, trackball, etc.), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 7:
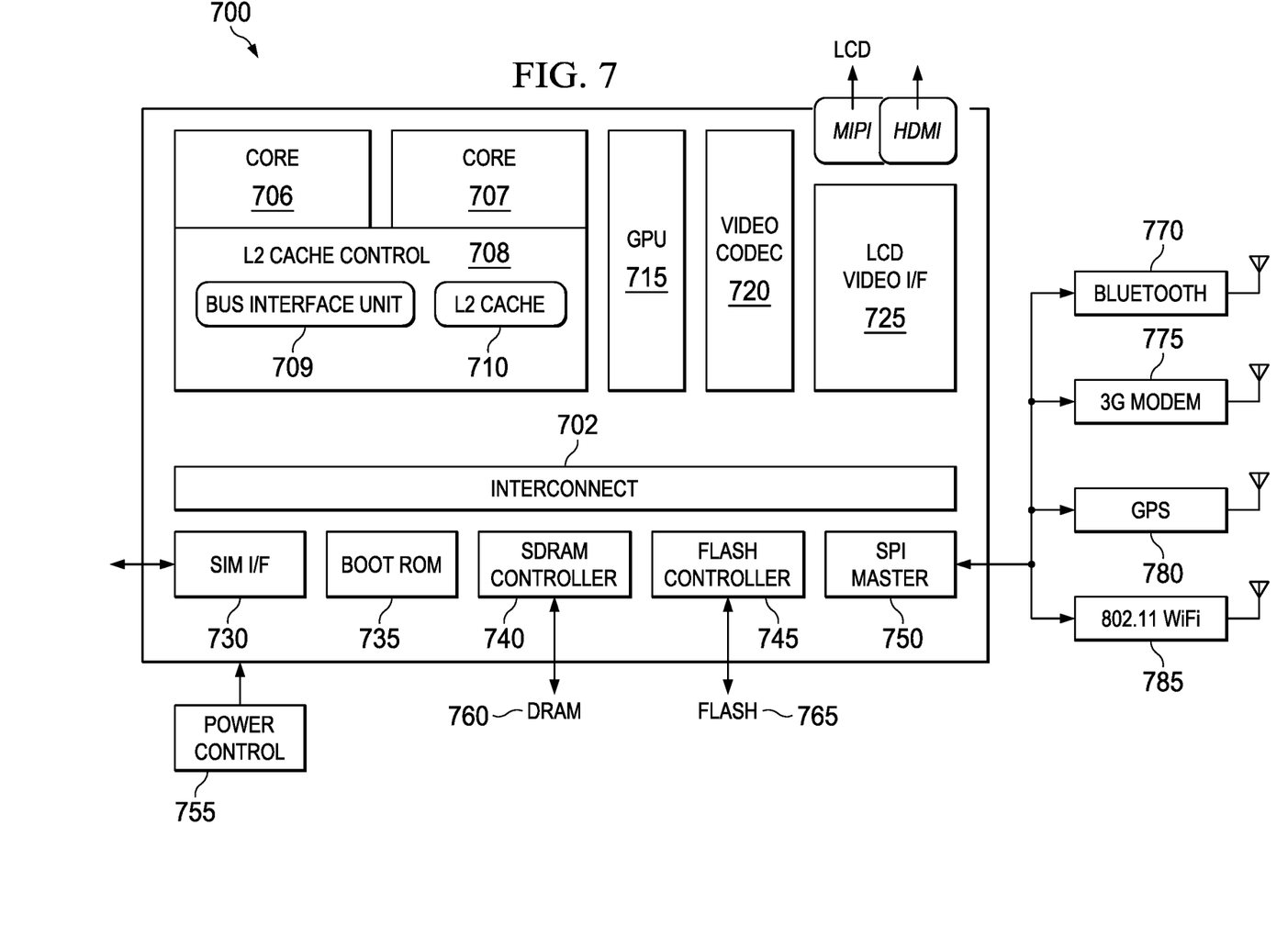
FIG. 7 is a simplified block diagram associated with an example ARM ecosystem system on chip (SOC) of the present disclosure.

Turning to FIG. 7, FIG. 7 is a simplified block diagram associated with an example ARM ecosystem SOC 700 of the present disclosure. At least one example implementation of the present disclosure can include the virtualized trusted storage features discussed herein and an ARM component. For example, the example of FIG. 7 can be associated with any ARM core (e.g., A-7, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 7, ARM ecosystem SOC 700 may include multiple cores 706-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/ high-definition multimedia interface (HDMI) links that couple to an LCD.

ARM ecosystem SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 765. In addition, one or more embodiments include one or more communication capabilities, interfaces, and features such as instances of Bluetooth™ 770, a 3G modem 775, a global positioning system (GPS) 780, and an 802.11 Wi-Fi 785.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
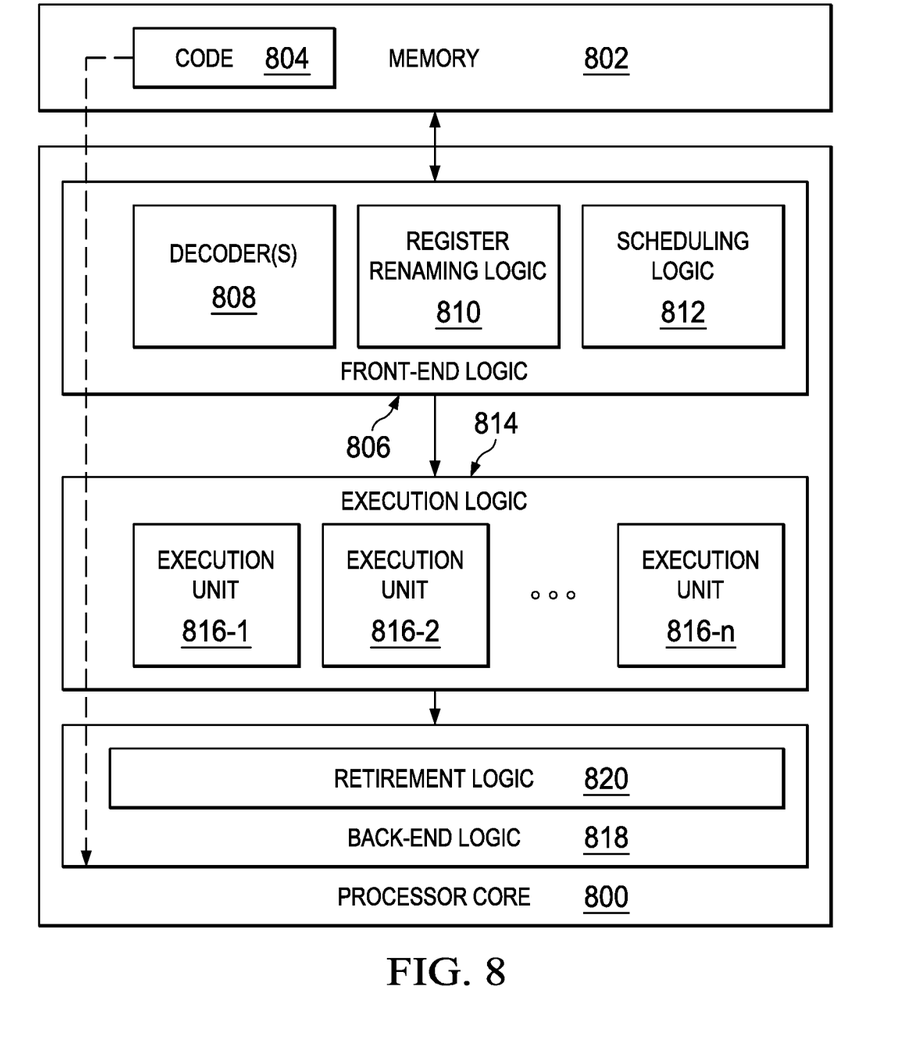
FIG. 8 is a block diagram illustrating an example processor core in accordance with an embodiment.

FIG. 8 illustrates a processor core 800 according to an embodiment. Processor core 800 may be the core for any type of processor, such as a micro-processor, an embedded processor, a digital signal processor (DSP), a network processor, or other device to execute code. Although only one processor core 800 is illustrated in FIG. 8, a processor may alternatively include more than one of the processor core 800 illustrated in FIG. 8. For example, processor core 800 represents one example embodiment of processors cores 674a, 674b, 684a, and 684b shown and described with reference to processors 670 and 680 of FIG. 6. Processor core 800 may be a single-threaded core or, for at least one embodiment, processor core 800 may be multithreaded in that it may include more than one hardware thread context (or "logical processor") per core.

FIG. 8 also illustrates a memory 802 coupled to processor core 800 in accordance with an embodiment. Memory 802 may be any of a wide variety of memories (including various layers of memory hierarchy) as are known or otherwise available to those of skill in the art. Memory 802 may include code 804, which may be one or more instructions, to be executed by processor core 800. Processor core 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor core 800 can also include execution logic 814 having a set of execution units 816-1 through 816-N. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor core 800 allows out of order execution but requires in order retirement of instructions. Retirement logic 820 may take a variety of known forms (e.g., re-order buffers or the like). In this manner, processor core 800 is transformed during execution of code 804, at least in terms of the output generated by the decoder, hardware registers and tables utilized by register renaming logic 810, and any registers (not shown) modified by execution logic 814.

Although not illustrated in FIG. 8, a processor may include other elements on a chip with processor core 800, at least some of which were shown and described herein with reference to FIG. 6. For example, as shown in FIG. 6, a processor may include memory control logic along with processor core 800. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication systems 100a and 100b and its teachings are readily scalable and can accommodate a large number of components, as well as more complicated/sophisticated arrangements and configurations. Accordingly, the examples provided should not limit the scope or inhibit the broad teachings of communication systems 100a and 100b as potentially applied to a myriad of other architectures.

It is also important to note that the operations in the preceding flow diagrams (i.e., FIGS. 4 and 5) illustrate only some of the possible correlating scenarios and patterns that may be executed by, or within, communication systems 100a and 100b. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems 100a and 100b in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication systems 100a and 100b has been illustrated with reference to particular elements and operations that facilitate the communication process, these elements and operations may be replaced by any suitable architecture, protocols, and/or processes that achieve the intended functionality of communication systems 100a and 100b.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable medium having one or more instructions that when executed by at least one processor, cause the at least processor to receive a request from a process to access data is a system, determine if the data is in a virtualized protected area of memory in the system, and allow access to the data if the data is in the virtualized protected area of memory and the process is a trusted process.

In Example C2, the subject matter of Example C1 can optionally include where the one or more instructions that when executed by the at least one processor, further cause the at least one processor to determine if new data should be protected, store the new data in the virtualized protected area of memory in the system if the new data should be protected, and store the new data in an unprotected area of memory in the system if the new data should not be protected.

In Example C3, the subject matter of any one of Examples C1-C2 can optionally include where the device characteristics are at least partially based on other device characteristics of similar devices.

In Example C4, the subject matter of any one of Examples C1-C3 can optionally include where the virtualized protected area of memory is a secured vault or a locally encrypted virtual file system.

In Example C5, the subject matter of any one of Examples C1-C4 can optionally include where the virtualized protected area of memory is a cloud vault.

In Example C6, the subject matter of any one of Example C1-C5 can optionally include where a filter driver controls input and output access to the virtualized protected area of memory.

In Example A1, an electronic device can include a security storage module, where the security storage module is configured to receive a request from a process to access data is a system, determine if the data is in a virtualized protected area of memory in the system, and allow access to the data if the data is in the virtualized protected area of memory and the process is a trusted process.

In Example, A2, the subject matter of Example A1 can optionally include where the security storage module is further configured to determine if new data should be protected, store the new data in the virtualized protected area of memory in the system if the new data should be protected, and store the new data in an unprotected area of memory in the system if the new data should not be protected.

In Example A3, the subject matter of any one of Examples A1-A2 can optionally include where the virtualized protected area of memory is a secured vault or a locally encrypted virtual file system.

In Example A4, the subject matter of any one of Examples A1-A3 can optionally include where the virtualized protected area of memory is a cloud vault.

In Example A5, the subject matter of any one of Examples A1-A4 can optionally include where a filter driver controls input and output access to the virtualized protected area of memory.

Example M1 is a method including receiving a request from a process to access data is a system, determining if the data is in a virtualized protected area of memory in the system, and allowing access to the data if the data is in the virtualized protected area of memory and the process is a trusted process.

In Example M2, the subject matter of Example M1 can optionally include determining if new data should be protected, storing the new data in the virtualized protected area of memory in the system if the new data should be protected, and storing the new data in an unprotected area of memory in the system if the new data should not be protected.

In Example M3, the subject matter of any one of the Examples M1-M2 can optionally include where the virtualized protected area of memory is a secured vault or a locally encrypted virtual file system.

In Example M4, the subject matter of any one of the Examples M1-M3 can optionally include where the virtualized protected area of memory is a cloud vault.

In Example M5, the subject matter of any one of the Examples M1-M4 can optionally include denying access to the data if the data is in the virtualized protected area of memory and the process is an untrusted process.

In Example M6, the subject matter of any one of the Examples M1-M5 can optionally include where a filter driver controls input and output access to the virtualized protected area of memory.

Example S1 is a system for virtualized trusted secure storage, the system including a security storage module configured to receive a request from a process to access data is a system, determine if the data is in a virtualized protected area of memory in the system, and allow access to the data if the data is in the virtualized protected area of memory and the process is a trusted process.

In Example S2, the subject matter of Example S1 can optionally include where system is further configured to determine if new data should be protected, store the new data in the virtualized protected area of memory in the system if the new data should be protected, and store the new data in an unprotected area of memory in the system if the new data should not be protected.

In Example S3, the subject matter of any one of the Examples S1-S2 can optionally include where the virtualized protected area of memory is a secured vault or a locally encrypted virtual file system.

In Example S4, the subject matter of any one of the Examples S1-S3 can optionally include where the virtualized protected area of memory is a cloud vault.

In Example S5, the subject matter of any one of the Examples S1-S4 can optionally include a filter driver controls input and output access to the virtualized protected area of memory.

Example X1 is a machine-readable storage medium including machine-readable instructions to implement a method or realize an apparatus as in any one of the Examples A1-A5, or M1-M6. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine-readable medium comprising one or more instructions that when executed by a processor, cause the processor to:
receive a request from a process to access data in a system;
determine whether the data is in a virtualized protected area of memory in the system, wherein the virtualized protected area of memory is a secured storage area;
responsive to determining that the data is in the virtualized protected area of memory, determine whether the process is a trusted process; and
display an untrusted view of the location of the data based on a determination that the process is an untrusted process, wherein the untrusted view includes only data stored in an unprotected area of memory; or
display a trusted view of the location of the data and allow access to the data based on a determination that the process is a trusted process, wherein the trusted view includes data stored in the unprotected and the virtualized protected areas of memory.

2. The at least one non-transitory machine-readable medium of claim 1, further comprising one or more instructions that when executed by the processor, cause the processor to:
determine whether new data should be protected;
store the new data in the virtualized protected area of memory in the system based on a determination that the new data should be protected; and
store the new data in the unprotected area of memory in the system based on a determination that the new data should not be protected.

3. The at least one non-transitory machine-readable medium of claim 1, wherein the virtualized protected area of memory is a secured vault.

4. The at least one non-transitory machine-readable medium of claim 1, wherein the virtualized protected area of memory is a cloud vault.

5. The at least one non-transitory machine-readable medium of claim 1, further comprising one or more instructions that when executed by the processor, cause the processor to:
responsive to determining that the data is not in a virtualized protected area of memory, allow access to the data.

6. An apparatus comprising:
a hardware processor configured to:
receive a request from a process to access data in a system;
determine whether the data is in a virtualized protected area of memory in the system, wherein the virtualized protected area of memory is a secure storage area;
responsive to determining that the data is in the virtualized protected area of memory, determine whether the process is a trusted process; and
display an untrusted view of the location of the data based on a determination that the process is an untrusted process, wherein the untrusted view includes only data stored in an unprotected area of memory; or
display a trusted view of the location of the data and allow access to the data based on a determination that the process is a trusted process, wherein the trusted view includes data stored in the unprotected and the virtualized protected areas of memory.

7. The apparatus of claim 6, wherein the hardware processor is further configured to:
determine whether new data should be protected;
store the new data in the virtualized protected area of memory in the system based on a determination that the new data should be protected; and
store the new data in the unprotected area of memory in the system based on a determination that the new data should not be protected.

8. The apparatus of claim 6, wherein the virtualized protected area of memory is a secured vault.

9. The apparatus of claim 6, wherein the virtualized protected area of memory is a cloud vault.

10. The apparatus of claim 6, wherein a filter driver controls input and output access to the virtualized protected area of memory.

11. A method comprising:
receiving a request from a process to access data in a system;
determining whether the data is in a virtualized protected area of memory in the system, wherein the virtualized protected area of memory is a secured storage area;
responsive to determining that the data is in a virtualized protected area of memory, determining whether the process is a trusted process; and
displaying an untrusted view of the location of the data based on a determination that the process is an untrusted process, wherein the untrusted view includes only data stored in an unprotected area of memory; or
displaying a trusted view of the location of the data and allowing access to the data based on a determination that the process is a trusted process, wherein the trusted view includes data stored in the unprotected and the virtualized protect areas of memory.

12. The method of claim 11, further comprising:
determining whether new data should be protected;
storing the new data in the virtualized protected area of memory in the system based on a determination that the new data should be protected; and
storing the new data in the unprotected area of memory in the system based on a determination that the new data should not be protected.

13. The method of claim 11, wherein the virtualized protected area of memory is a secured vault.

14. The method of claim 11, wherein the virtualized protected area of memory is a cloud vault.

15. The method of claim 11, further comprising:
denying access to the data based on a determination that the data is in the virtualized protected area of memory and the process is an untrusted process.

16. A system for virtualized trusted secure storage, the system comprising:
a hardware processor configured to:
receive a request from a process to access data in a system;
determine whether the data is in a virtualized protected area of memory in the system, wherein the virtualized protected area of memory is a secured storage area;
responsive to determining that the data is in a virtualized protected area of memory, determine whether the process is a trusted process; and
display an untrusted view of the location of the data based on a determination that the process is an untrusted process, wherein the untrusted view includes only data stored in an unprotected area of memory; or display a trusted view of the location of the data and allow access to the data based on a determination that the process is a trusted process, wherein the trusted view includes data stored in the unprotected and the virtualized protected areas of memory.

17. The system of claim 16, wherein the system is further configured to:
   determine whether new data should be protected;
   store the new data in the virtualized protected area of memory in the system based on a determination that the new data should be protected; and
   store the new data in the unprotected area of memory in the system based on a determination that the new data should not be protected.

18. The system of claim 16, wherein the virtualized protected area of memory is a secured vault.

19. The system of claim 16, wherein the virtualized protected area of memory is a cloud vault.

20. The system of claim 16, wherein the hardware processor is further configured to:
   responsive to determining that the data is not in a virtualized protected area of memory, allow access to the data.

* * * * *